(12) United States Patent
Fuku et al.

(10) Patent No.: US 6,868,170 B1
(45) Date of Patent: Mar. 15, 2005

(54) VEHICLE KEY SYSTEM

(75) Inventors: Masaru Fuku, Tokyo (JP); Keiichi Enoki, Tokyo (JP); Hirofumi Tatsukawa, Tokyo (JP); Hisashi Ishikura, Tokyo (JP); Toru Morita, Tokyo (JP); Fumitaka Satou, Tokyo (JP); Koji Nagao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 627 days.

(21) Appl. No.: 09/650,629

(22) Filed: Aug. 28, 2000

(30) Foreign Application Priority Data

Mar. 21, 2000 (JP) ........................................ 2000-078932

(51) Int. Cl.[7] ................................................ G06K 9/00
(52) U.S. Cl. ...................................... 382/124; 340/5.53
(58) Field of Search ................................ 382/115, 116, 382/120, 122, 124, 125, 126, 127; 340/904, 5.72, 5.2, 5.53, 5.83, 525.69; 345/173

(56) References Cited

U.S. PATENT DOCUMENTS

| | | | | |
|---|---|---|---|---|
| 6,100,811 A | * | 8/2000 | Hsu et al. | .................. 340/5.83 |
| 6,104,386 A | * | 8/2000 | Yaotani | ...................... 345/173 |
| 6,140,939 A | * | 10/2000 | Flick | ...................... 340/825.69 |
| 6,271,745 B1 | * | 8/2001 | Anzai et al. | ................ 340/5.53 |
| 6,373,148 B1 | | 4/2002 | Daiss et al. | |

FOREIGN PATENT DOCUMENTS

| | | | |
|---|---|---|---|
| DE | 197 29 404 A1 | 2/1999 | |
| FR | 2 784 066 A1 | 4/2000 | |
| JP | 61-64977 | 4/1986 | .......... E05B/49/00 |
| JP | 5-22791 | 3/1993 | .......... E05B/49/00 |
| JP | 5-27791 | 3/1993 | .......... E05B/49/00 |
| JP | 11-93478 | 4/1999 | .......... E05B/49/00 |
| JP | 11-245771 | 9/1999 | .......... B60R/25/10 |

* cited by examiner

Primary Examiner—Vikkram Bali
(74) Attorney, Agent, or Firm—Sughrue Mion, PLLC

(57) ABSTRACT

A vehicle key system includes a fingerprint verification unit for verifying identity of fingerprint information captured by a fingerprint information capturing unit by comparing it with a list of pieces of fingerprint information about fingerprints of authorized users stored in a fingerprint information storage unit. A manipulation detection unit can detect at least one of a predetermined manipulation of an operation unit, such as a wiper switch, a winker switch, or a shift lever, and a predetermined manipulation of a pedal, such as an acceleration pedal, a brake pedal, or a clutch pedal. A processing mode switching unit can switch between a plurality of processing modes according to the predetermined manipulation detected by the manipulation detection unit.

11 Claims, 2 Drawing Sheets

VEHICLE KEY SYSTEM

BACKGROUND OF THE INVENTION

1. Field of the Invention

The present invention relates to a vehicle key system for verifying identity of fingerprint information captured and for controlling pieces of equipment in a vehicle according to the verification result. More particularly, it relates to a vehicle key system capable of switching between a plurality of processing modes by detecting a predetermined manipulation performed by users without having to provide an additional switch or the like intended for enabling users to perform switching between the plurality of processing modes, thereby reducing the cost of the system.

2. Description of the Prior Art

In a conventional vehicle key system as disclosed in Japanese patent publication (TOKKOUHEI) 5-22791, fingerprint information captured by a sensor or the like is transmitted from a mobile transmitter to a receiver mounted on a vehicle and the fingerprint information is verified against pre-registered fingerprint information. The vehicle key system can release the lock of doors only if there is a match between them. When an authorized user wants to register information about the user's fingerprint, he or she has to manipulate a switch or the like to switch the system to a registration mode in which fingerprint information is captured from the user's finger and is registered to the system.

Japanese patent application publications No.61-64977, No.11-93478, and No. 11-245771 disclose other conventional vehicle key systems, respectively.

A problem with conventional vehicle key systems constructed as above is that there is a need to provide a switch intended for switching between a plurality of fingerprint information processing modes, such as a verification mode in which identity of users is verified and a registration mode in which fingerprint information about a new user's fingerprint is registered, and therefore the cost of implementing the vehicle key system is increased because of the above-mentioned switch.

Another problem is that it is difficult to provide space for the above-mentioned switch intended for switching between the plurality of fingerprint information processing modes in a case that a number of switches are already provided, and therefore the switch is easy to manipulate by accident.

A further problem is that the provision of such a switch can cause users to touch the switch by mistake and then manipulate the switch by accident.

SUMMARY OF THE INVENTION

The present invention is proposed to solve the above problems. It is therefore an object of the present invention to provide a vehicle key system capable of detecting a predetermined manipulation performed by users and then switching between a plurality of processing modes according to the detected manipulation, without having to provide an additional switch or the like for enabling users to perform switching between the plurality of processing modes, thereby preventing users from switching the plurality of processing modes by accident and reducing the cost of the system.

In accordance with one aspect of the present invention, there is provided a vehicle key system for verifying identity of fingerprint information about a user's fingerprint and for controlling pieces of equipment in a vehicle according to a verification result, the system comprising: a fingerprint information capturing unit for capturing fingerprint information from a user's fingerprint; a fingerprint information storage unit for pre-storing at least a piece of fingerprint information about an authorized user's fingerprint; a fingerprint verification unit for verifying identity of the fingerprint information captured by the fingerprint information capturing unit by comparing it with the authorized user's fingerprint information stored in the fingerprint information storage unit; a fingerprint information processing unit for performing a plurality of fingerprint processes in a plurality of processing modes, respectively; a manipulation detection unit for detecting at least one of a predetermined manipulation of an operation unit and a predetermined manipulation of a pedal; and a processing mode switching unit for switching between the plurality of processing modes according to the predetermined manipulation detected by the manipulation detection unit.

Preferably, the plurality of processing modes include a first processing mode in which the system can allow the user to use the vehicle after the fingerprint verification unit establishes the identity of the user's fingerprint information, and a second processing mode in which the system can register the user's fingerprint information to the fingerprint information storage unit. The processing mode switching unit can switch between the first and second processing modes according to the predetermined manipulation detected by the manipulation detection unit.

Preferably, the plurality of processing modes further include a third processing mode in which the system can delete corresponding fingerprint information stored in the fingerprint information storage unit. In this case, the processing mode switching unit can switch between the first and third processing modes according to the predetermined manipulation detected by the manipulation detection unit.

Preferably, the plurality of processing modes further include a fourth processing mode in which the system can allow the user to use the vehicle without verification of the identity of the user's fingerprint information. In this case, the processing mode switching unit can switch between the first and fourth processing modes according to the predetermined manipulation detected by the manipulation detection unit.

Preferably, the plurality of processing modes include a first processing mode in which the system can allow the user to use the vehicle after the fingerprint verification unit establishes the identity of the user's fingerprint information, a second processing mode in which the system can register the user's fingerprint information to the fingerprint information storage unit, a third processing mode in which the system can delete corresponding fingerprint information stored in the fingerprint information storage unit, and a fourth processing mode in which the system can allow the user to use the vehicle without verification of the identity of the user's fingerprint information. In this case, the processing mode switching unit can switch between the first processing mode and either one of the second, third, and fourth processing modes according to the predetermined manipulation detected by the manipulation detection unit.

The operation unit can be a wiper switch, a winker switch, or a shift lever. The pedal can be an acceleration pedal, a brake pedal, or a clutch pedal.

As an alternative, the operation unit can be a one intended for manipulating a navigation unit for providing a variety of navigation services, such as guidance on a route from a current position to a destination, for users.

In accordance with another preferred embodiment of the present invention, there is provided a vehicle key system for verifying identity of fingerprint information about a user's fingerprint and for controlling pieces of equipment in a vehicle according to a verification result, the system comprising: a fingerprint information capturing unit for capturing fingerprint information from a user's fingerprint; a fingerprint information storage unit for pre-storing at least a piece of fingerprint information about an authorized user's fingerprint; a fingerprint verification unit for verifying identity of the fingerprint information captured by the fingerprint information capturing unit by comparing it with the authorized user's fingerprint information stored in the fingerprint information storage unit; a fingerprint information processing unit for performing a plurality of fingerprint processes in a plurality of processing modes, respectively; a connecting unit for connecting the system with a given external unit; a manipulation detection unit for detecting a signal applied thereto via the connecting unit, the signal indicating a predetermined manipulation of the external unit; and a processing mode switching unit for switching between the plurality of processing modes according to the signal detected by the manipulation detection unit.

Preferably, the plurality of processing modes include a first processing mode in which the system can allow the user to use the vehicle after the fingerprint verification unit establishes the identity of the user's fingerprint information, and a second processing mode in which the system can register the user's fingerprint information to the fingerprint information storage unit. The processing mode switching unit can switch between the first and second processing modes according to the signal detected by the manipulation detection unit.

Preferably, the plurality of processing modes further include a third processing mode in which the system can delete corresponding fingerprint information stored in the fingerprint information storage unit. In this case, the processing mode switching unit can switch between the first and third processing modes according to the signal detected by the manipulation detection unit.

Preferably, the plurality of processing modes further include a fourth processing mode in which the system can allow the user to use the vehicle without verification of the identity of the user's fingerprint information. In this case, the processing mode switching unit can switch between the first and fourth processing modes according to the signal detected by the manipulation detection unit.

Preferably, the plurality of processing modes include a first processing mode in which the system can allow the user to use the vehicle after the fingerprint verification unit establishes the identity of the user's fingerprint information, a second processing mode in which the system can register the user's fingerprint information to the fingerprint information storage unit, a third processing mode in which the system can delete corresponding fingerprint information stored in the fingerprint information storage unit, and a fourth processing mode in which the system can allow the user to use the vehicle without verification of the identity of the user's fingerprint information. In this case, the processing mode switching unit can switch between the first processing mode and either one of the second, third, and fourth processing modes according to the predetermined manipulation detected by the manipulation detection unit.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
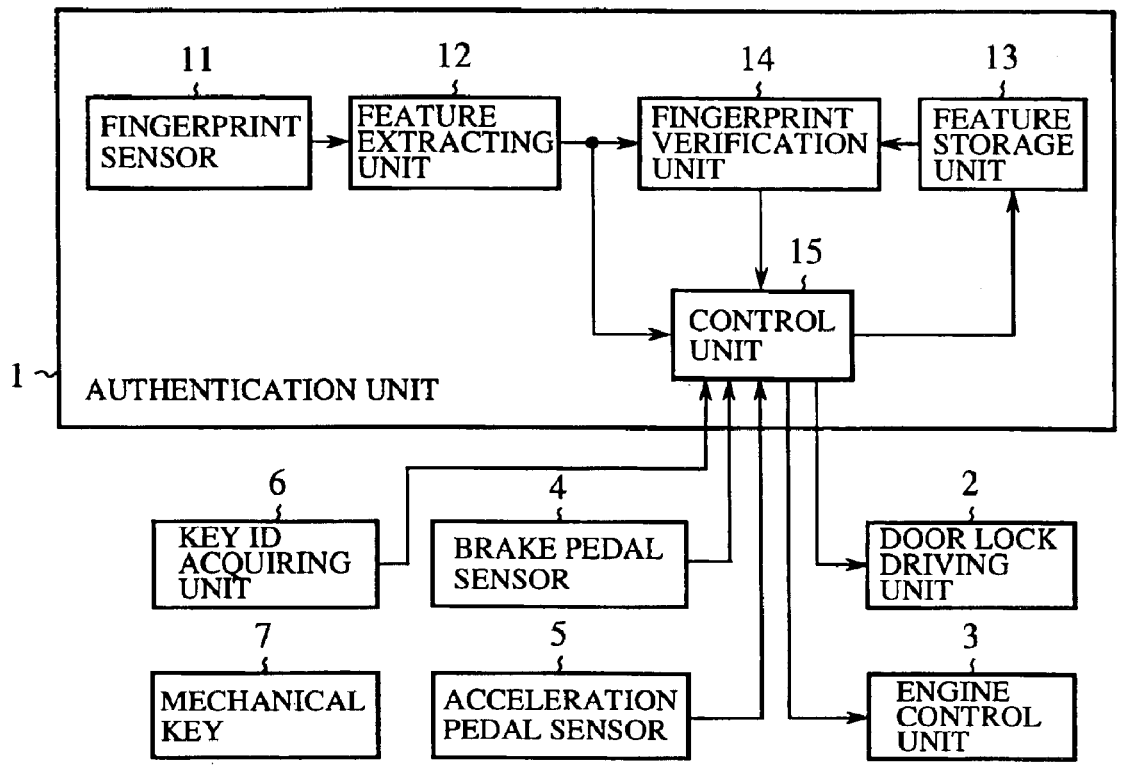
FIG. 1 is a block diagram showing the structure of a vehicle key system according to a first embodiment of the present invention.

Referring next to FIG. 1, there is illustrated a block diagram showing the structure of a vehicle key system according to a first embodiment of the present invention. In the figure, reference numeral 1 denotes an authentication unit for registering fingerprint information about fingerprints of authorized users thereto in advance.

The authentication unit 1 includes a fingerprint sensor 11 for illuminating a user's finger and detecting light reflected from the finger to capture a fingerprint image, a feature extracting unit 12 for extracting features, as fingerprint information, from the fingerprint image captured by the fingerprint sensor 11, a feature storage unit 13 for storing a list of pieces of fingerprint information about fingerprints of authorized users, i.e., a plurality of sets of features extracted from the fingerprints of authorized users, a fingerprint verification unit 14 for verifying the identity of the user by comparing the features extracted by the feature extracting unit 12 against the plurality of sets of features stored in the feature storage unit 13, and a control unit 15 for switching between a plurality of processing modes according to signals from a brake pedal sensor 4 for detecting a manipulation of a brake pedal and an accelerator pedal sensor for detecting a manipulation of an accelerator pedal, and for controlling a door lock driving unit 2 and an engine control unit or ECU 3, which are pieces of equipment in the vehicle, according to a verification result from a key ID acquiring unit 6 for verifying the identity of a key ID which the key ID acquiring unit 6 acquires from a mechanical key 7 and the verification result from the fingerprint verification unit 14.

The door lock driving unit 2 can lock doors or release the lock of the doors according to a control signal from the control unit 15. The ECU 3 can allow or prohibit users to start the engine according to a control signal from the control unit 15. The brake pedal sensor 4 can detect a mechanical manipulation performed on a brake pedal not shown and generate an electrical signal indicating the mechanical manipulation to the control unit 15. The acceleration pedal sensor 5 can detect a mechanical manipulation performed on an acceleration pedal not shown and generate an electrical signal indicating the mechanical manipulation to the control unit 15. The key ID acquiring unit 6 can acquire a key ID from the mechanical key 7. Users can mechanically release the lock of doors using the mechanical key 7. The key ID assigned to the mechanical key 7 is used for the key ID acquiring unit 6 to determine whether or not the key 7 is an authorized key.

Figure 2:
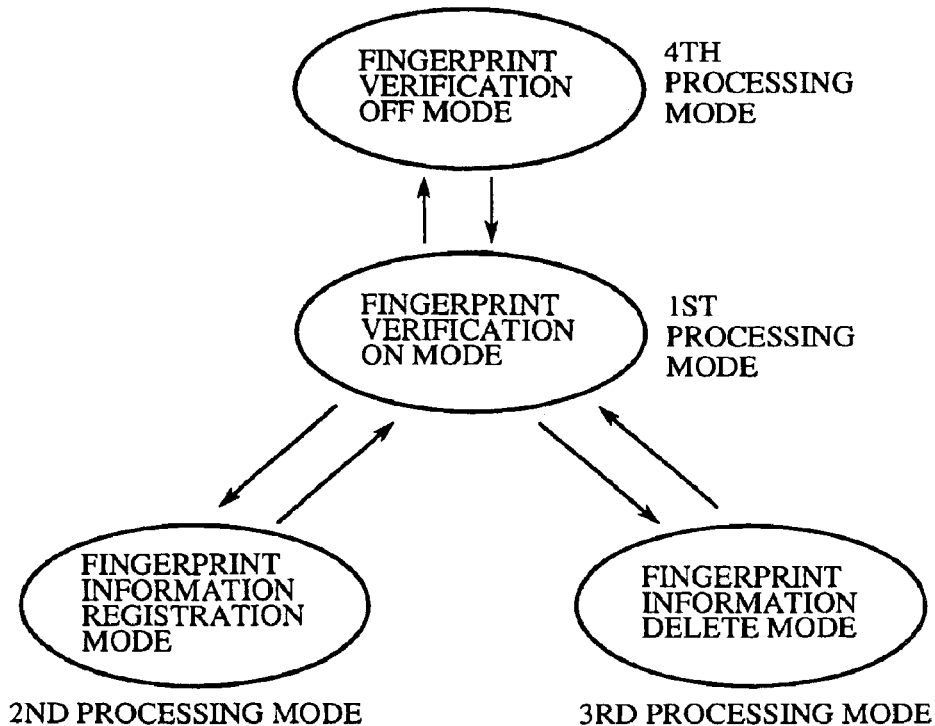
FIG. 2 is a state transition diagram showing state transitions between a plurality of processing modes which the vehicle key system according to the first embodiment can have.

Referring next to FIG. 2, there is illustrated a state transition diagram showing state transitions between the plurality of processing modes which the vehicle key system according to the first embodiment can have. The control unit 15 switches a current processing mode between a fingerprint verification on mode and either one of a fingerprint verification off mode, a fingerprint information registration mode, and a fingerprint information delete mode. Initially, the system is in the fingerprint verification on mode.

While the system is in the fingerprint verification on mode, the feature extracting unit 12 can extract features from a user's fingerprint image captured by the fingerprint sensor 11 and the fingerprint verification unit 14 then compare the extracted features against the plurality of sets of pre-registered features stored in the feature storage unit 13. The fingerprint verification unit 14 then furnishes a signal indicating whether a match exists to the control unit 15. In general, the features of a fingerprint include the size and contours of the fingerprint, the presence or absence of whorls, the number of ridges, and the orientations of streams of ridges. When the control unit 15 receives a signal indicating that a match exists, it controls the door lock driving unit 2 so as to release the lock of doors and controls the ECU 3 so as to allow the user to start the engine. In contrast, when the control unit 15 receives a signal indicating that a match does not exist, it controls the door lock driving unit 2 so as to protect the lock of doors from being released and controls the ECU 3 so as to prohibit the user from starting the engine. When no fingerprint information is registered in the feature storage unit 13, the user can release the lock of doors using the mechanical key 7 and enter the vehicle even in the fingerprint verification on mode.

While the system is in the fingerprint verification off mode, the control unit 15 can control the door lock driving unit 2 so as to release the lock of doors and control the ECU 3 so as to allow the user to start the engine, without performing the verification of the user's fingerprint. In this state, the user can release the lock of doors and start the engine with the mechanical key 7. For example, when the user makes a request of an outsider who is not an authorized user, such as a clerk at a dealer or a door man at a hotel, to manage the vehicle temporarily, the user can switch the processing mode to the fingerprint verification off mode.

While the system is in the fingerprint information registration mode, the feature extraction unit 12 can extract features from a user's fingerprint image captured by the fingerprint sensor 11 and the control unit 15 can store the extracted features in the feature storage unit 13.

While the system is in the fingerprint information delete mode, the control unit 15 can delete a set of features corresponding to the features extracted by the feature extracting unit 12 from the feature storage unit 13.

Next, a description will be made as to the operation of switching between the fingerprint verification on mode and either one of the fingerprint verification off mode, the fingerprint information registration mode, and the fingerprint information delete mode.

While the system is in the fingerprint verification on mode, the user can release the lock of doors and enter the vehicle if the fingerprint information about the user's fingerprint is already registered in the feature storage unit 13 of the authentication unit. Even when no fingerprint information is registered in the feature storage unit 13, the user can release the lock of doors using the mechanical key 7 and enter the vehicle. When the user then performs a manipulation on the brake pedal or the accelerator pedal without starting the engine, the brake pedal sensor 4 or the accelerator pedal sensor 5 detects the manipulation and then furnishes a signal indicating the manipulation to the control unit 15. When the manipulation is a predetermined one for triggering switching from the fingerprint verification on mode to the fingerprint information registration mode, the control unit 15 switches the current processing mode from the fingerprint verification on mode to the fingerprint information registration mode. For example, when the user depresses the brake pedal eight times and also depresses the acceleration pedal ten times, the current processing mode is switched from the fingerprint verification on mode to the fingerprint information registration mode.

After that, the user can perform a predetermined manipulation to make the current processing mode revert back to the fingerprint verification on mode. As an alternative, the control unit 15 can be so constructed as to automatically make the current processing mode revert back to the fingerprint verification on mode after the features of the user's fingerprint have been registered, as fingerprint information, in the authentication unit.

The description will be directed to switching from the fingerprint verification on mode to the fingerprint information delete mode. When the user manipulates the brake pedal or the accelerator pedal without starting the engine, the brake pedal sensor 4 or the accelerator pedal sensor 5 detects the manipulation and furnishes a signal indicating the manipulation to the control unit 15. When the manipulation is a predetermined one for triggering switching from the fingerprint verification on mode to the fingerprint information delete mode, the control unit 15 switches the current processing mode from the fingerprint verification on mode to the fingerprint information delete mode. The predetermined manipulation differs from that to be done for triggering switching from the fingerprint verification on mode to the fingerprint information registration mode.

When the current processing mode is switched to the fingerprint information delete mode, the control unit 15 can delete corresponding fingerprint features stored in the feature storage unit 13. After that, the user can perform a predetermined manipulation to make the current processing mode revert back to the fingerprint verification on mode. As an alternative, the control unit 15 can be so constructed as to automatically make the current processing mode revert back to the fingerprint verification on mode after corresponding fingerprint features or corresponding fingerprint information has been deleted from the feature storage unit.

The description will be directed to switching from the fingerprint verification on mode to the fingerprint verification off mode. When the user performs a manipulation on the brake pedal or the accelerator pedal without starting the engine, the brake pedal sensor 4 or the accelerator pedal sensor 5 detects the manipulation and furnishes a signal indicating to the manipulation to the control unit 15. When the manipulation is a predetermined one for triggering switching from the fingerprint verification on mode to the fingerprint verification off mode, the control unit 15 switches the current processing mode from the fingerprint verification on mode to the fingerprint verification off mode. The predetermined manipulation differs from that to be done for triggering switching from the fingerprint verification on mode to the fingerprint information registration mode and that to be done for triggering switching from the fingerprint verification on mode to the fingerprint information delete mode.

After that, the user can perform a predetermined manipulation to make the current processing mode revert back to the fingerprint verification on mode.

As previously mentioned, when the user performs a predetermined manipulation on the brake pedal and/or the accelerator pedal, the control unit 15 performs switching between the plurality of processing modes. As an alternative, an existing control switch or pedal intended for vehicles, such as a clutch pedal, a wiper switch, or a winker switch, can be manipulated by users when triggering switching between the plurality of processing modes. The fingerprint sensor can be disposed inside or outside the vehicle. The fingerprint sensor can be a mobile one capable of transmitting the captured fingerprint image to the feature extracting unit 12 via radio frequencies.

As previously mentioned, in accordance with the first embodiment, the vehicle key system can detect a predetermined manipulation, which is performed on the brake pedal and/or the acceleration pedal by users, by means of the brake pedal sensor 4 and the acceleration pedal sensor 5 and then switch the current processing mode between the plurality of processing modes according to the detected manipulation. Accordingly, the first embodiment offers an advantage of being able to prevent users from switching the plurality of processing modes by accident, and to reduce the cost of the system because the system does not need an additional switch or the like for enabling users to perform switching between the plurality of processing modes. In addition, since there is no need to machine the dashboard to mount the additional switch on the dashboard, the cost is further reduced.

Embodiment 2

Figure 3:
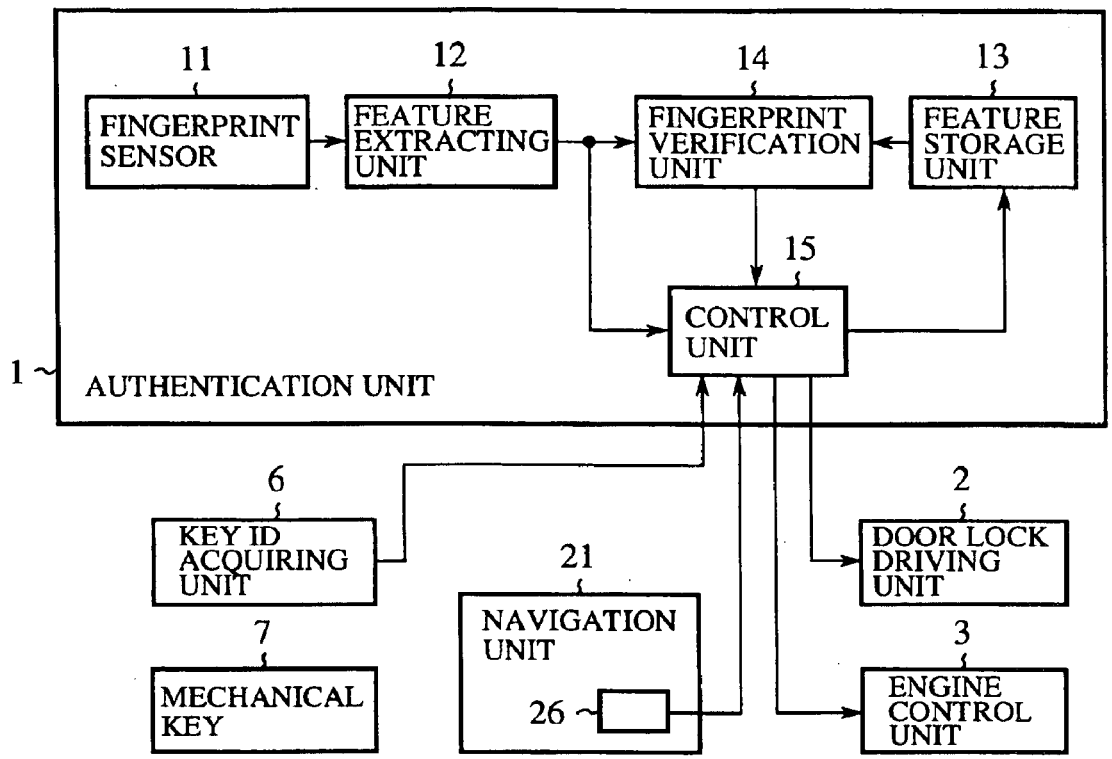
FIG. 3 is a block diagram showing the structure of a vehicle key system according to a second embodiment of the present invention.

Referring next to FIG. 3, there is illustrated a block diagram showing the structure of a vehicle key system according to a second embodiment of the present invention. In the figure, reference numeral 21 denotes a navigation unit provided with an operation unit 26, such as a switch, for providing a variety of navigation services, such as guidance on a route from a current position to a destination, for users. The other components of FIG. 3 of the vehicle key system are the same as those of the aforementioned first embodiment, and therefore the description of the other components will be omitted hereinafter.

In the vehicle key system of the second embodiment, the operation unit 26 of the navigation unit 21 can also serve as an operation unit used for triggering switching between a plurality of processing modes. When a user performs a predetermined manipulation on the navigation unit 21 through the operation unit 26, the navigation unit 21 furnishes a signal indicating the predetermined manipulation to the control unit 15 to make it perform switching between the plurality of processing modes according to the signal applied thereto. Both the previous processing mode and the new processing mode can be displayed on the screen of a display unit (not shown) of the navigation unit 21. In each of the plurality of processing modes, the control unit 15 operates in the same way that that of the first embodiment does. Therefore, the description of the operation of the control unit 15 in each of the plurality of processing modes will be omitted hereinafter.

As previously mentioned, in accordance with the second embodiment, the vehicle key system can switch the current processing mode between the plurality of processing modes according to a predetermined manipulation performed on the operation unit 26 of the existing navigation unit 21. Accordingly, the second embodiment offers an advantage of being able to reduce the cost of the system because the system does not need an additional switch or the like for enabling users to perform switching between the plurality of processing modes, and to prevent users from switching the plurality of processing modes by accident. In addition, since the switching between the plurality of processing modes can be displayed on the screen of the display unit of the navigation unit, users can recognize the switching visually, thereby improving the convenience of the system.

Embodiment 3

Figure 4:
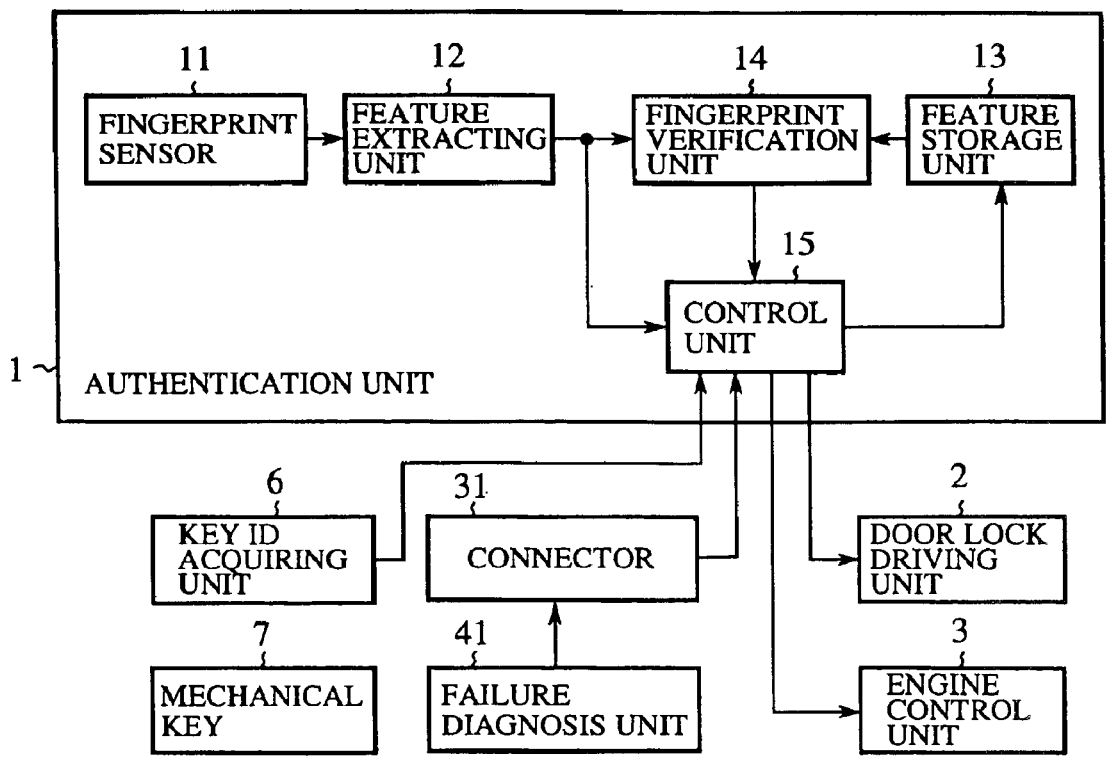
FIG. 4 is a block diagram showing the structure of a vehicle key system according to a third embodiment of the present invention.

Referring next to FIG. 4, there is illustrated a block diagram showing the structure of a vehicle key system according to a third embodiment of the present invention. In the figure, reference numeral 31 denotes a connector electrically connected to a failure diagnosis unit 41 provided with an operation unit (not shown), for carrying out failure diagnostic checks on vehicles. A control unit 15 can receive and transmit an electrical signal from and to the failure diagnosis unit 41 by way of the connector 31 when the failure diagnosis unit 41 is connected to the connector 31. The other components of FIG. 4 of the vehicle key system are the same as those of the aforementioned first embodiment, and therefore the description of the other components will be omitted hereinafter.

When the user wants to change the current processing mode, he or she connects the failure diagnosis unit 41 to the connector 31. When the user then performs a predetermined manipulation on the failure diagnosis unit 41 through the operation unit not shown, the failure diagnosis unit 41 furnishes a signal indicating the predetermined manipulation to the control unit 15 by way of the connector 31 to make it perform switching between the plurality of processing modes according to the signal applied thereto. Both the previous processing mode and the new processing mode can be displayed on the screen of the display unit (not shown) of the failure diagnosis unit 41. In each of the plurality of processing modes, the control unit 15 operates in the same way that that of the first embodiment does. Therefore, the description of the operation of the control unit 15 in each of the plurality of processing modes will be omitted hereinafter.

As previously mentioned, in accordance with the third embodiment, the vehicle key system can switch the current processing mode between the plurality of processing modes according to a signal applied thereto by way of the existing connector 31 used for failure diagnosis indicating a predetermined manipulation performed on the operation unit not shown of the failure diagnosis unit 41. Accordingly, the third embodiment offers an advantage of being able to reduce the cost of the system because the system does not need an additional switch or the like for enabling users to perform switching between the plurality of processing modes, and to prevent users from switching the plurality of processing modes by accident. In addition, since the switching between the plurality of processing modes can be displayed on the screen of the display unit not shown of the failure diagnosis unit, users can recognize the switching visually, thereby improving the convenience of the system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle key system for verifying an identity of fingerprint information regarding a fingerprint of a user and for controlling pieces of equipment in a vehicle according to a verification result regarding the identity of the fingerprint information, said system comprising:

a fingerprint information capturing means for capturing fingerprint information from the fingerprint of the user;

a fingerprint information storage means for storing at least one piece of fingerprint information regarding an authorized user;

a manipulation detection means for detecting manipulations of at least one operation unit for controlling the pieces of equipment in the vehicle and at least one pedal, wherein said operation unit comprises at least one of a wiper switch, a turn signal switch, a shift lever, and a navigation unit for providing navigation services;

a fingerprint verification means for verifying an identity of the fingerprint information captured by said fingerprint information capturing means in a first processing mode by comparing the fingerprint information captured by said fingerprint information capturing means with the fingerprint information of the authorized user stored in said fingerprint information storage means, wherein the vehicle key system is configured to operate in the first processing mode and at least a second processing mode for administering storage of information in the fingerprint information storage means; and a processing mode switching means for switching between the first and second processing modes according to detection of a predetermined manipulation of the at least one operation unit or the at least one pedal by said manipulation detection means.

2. The vehicle key system according to claim 1, wherein the first processing mode enables the user to use the vehicle after said fingerprint verification means establishes the identity of the fingerprint information of the user, and the second processing mode registers the fingerprint information of the user to said fingerprint information storage means, and wherein said processing mode switching means switches between the first and second processing modes according to the predetermined manipulation detected by said manipulation detection means.

3. The vehicle key system according to claim 1, wherein the first processing mode enables the user to use the vehicle after said fingerprint verification means establishes the identity of the fingerprint information of the user, and the second processing deletes corresponding fingerprint information stored in said fingerprint information storage means, and wherein said processing mode switching means switches between the first and second processing modes according to the predetermined manipulation detected by said manipulation detection means.

4. The vehicle key system according to claim 1, wherein the first processing mode enables the user to use the vehicle after said fingerprint verification means establishes the identity of the fingerprint information of the user, and the second processing mode enables the user to use the vehicle without verification of the identity of the fingerprint information of the user, and wherein said processing mode switching means switches between the first and second processing modes according to the predetermined manipulation detected by said manipulation detection means.

5. The vehicle key system according to claim 1, wherein the first processing mode enables the user to use the vehicle after said fingerprint verification means establishes the identity of the fingerprint information of the user, the second processing mode in which said system registers the fingerprint information of the user to said fingerprint information storage means, a third processing mode deletes corresponding fingerprint information stored in said fingerprint information storage means, and a fourth processing mode enables the user to use the vehicle without verification of the identity of the fingerprint information of the user, and wherein said processing mode switching means switches between the first processing mode and either one of the second, third, and fourth processing modes according to the predetermined manipulation detected by said manipulation detection means.

6. The vehicle key system according to claim 1, said pedal comprises an acceleration pedal, a brake pedal, or a clutch pedal.

7. A vehicle key system for verifying an identity of fingerprint information regarding a fingerprint of a user and for controlling pieces of equipment in a vehicle according to a verification result regarding the identity of the fingerprint information, said system comprising:

a fingerprint information capturing means for capturing fingerprint information from the fingerprint of the user;

a fingerprint information storage means for storing at least one piece of fingerprint information regarding an authorized user;

a fingerprint verification means for verifying an identity of the fingerprint information captured by said fingerprint information capturing means in a first processing mode by comparing the fingerprint information captured by said fingerprint information capturing means with the fingerprint information of the authorized user stored in said fingerprint information storage means, wherein the vehicle key system is configured to operate in the first processing mode and at least a second processing mode for administering storage of information in the fingerprint information storage means;

a connecting means for connecting said vehicle key system with an external unit and receiving a signal which indicates manipulation of the external unit; and a processing mode switching means for switching between the first and second processing modes when the vehicle key system detects the signal received by the connections means indicating a predetermined manipulation of the external unit.

8. The vehicle key system according to claim 7, wherein the first processing mode enables the user to use the vehicle after said fingerprint verification means establishes the identity of the fingerprint information of the user, and the second processing mode registers the fingerprint information of the user to said fingerprint information storage means, and wherein said processing mode switching means switches between the first and second processing modes when the vehicle key system detects the signal received by the connections means indicating the predetermined manipulation of the external means unit.

9. The vehicle key system according to claim 7, wherein the first processing mode in which said system enables the user to use the vehicle after said fingerprint verification means establishes the identity of the fingerprint information of the user, and the second processing deletes corresponding fingerprint information stored in said fingerprint information storage means, and wherein said processing mode switching means switches between the first and second processing modes when the vehicle key system detects the signal received by the connections means indicating the predetermined manipulation of the external unit.

10. The vehicle key system according to claim 7, wherein the first processing mode in which said system enables the user to use the vehicle after said fingerprint verification means establishes the identity of the fingerprint information of the user, and the second processing mode enables the user to use the vehicle without verification of the identity of the fingerprint information of the user, and wherein said processing mode switching means switches between the first and second processing modes when the vehicle key system detects the signal received by the connections means indicating the predetermined manipulation of the external unit.

11. The vehicle key system according to claim 7, wherein the first processing mode enables the user to use the vehicle after said fingerprint verification means establishes the identity of the fingerprint information of the user, the second processing mode registers the fingerprint information of the user to said fingerprint information storage means, a third processing mode deletes corresponding fingerprint information stored in said fingerprint information storage means, and a fourth processing mode enables the user to use the vehicle without verification of the identity of the fingerprint information of the user, and wherein said processing mode switching means switches between the first processing mode and either one of the second, third, and forth processing modes when the vehicle key system detects the signal received by the connections means indicating the predetermined manipulation of the external unit.

* * * * *